(12) United States Patent
Zhang et al.

(10) Patent No.: US 11,496,526 B2
(45) Date of Patent: Nov. 8, 2022

(54) SERVICE REQUEST PROCESSING METHOD, APPARATUS, AND COMMUNICATIONS SYSTEM

(71) Applicant: Huawei Technologies Co., Ltd., Shenzhen (CN)

(72) Inventors: Biao Zhang, Shenzhen (CN); Xuzu Shu, Dongguan (CN); Jun Zuo, Dongguan (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 16/913,531

(22) Filed: Jun. 26, 2020

(65) Prior Publication Data

US 2020/0329075 A1    Oct. 15, 2020

Related U.S. Application Data

(63) Continuation of application No. PCT/CN2018/119262, filed on Dec. 5, 2018.

(30) Foreign Application Priority Data

Dec. 29, 2017   (CN) .......................... 201711489721.3

(51) Int. Cl.
*H04L 65/1045* (2022.01)
*H04L 65/1016* (2022.01)
(Continued)

(52) U.S. Cl.
CPC ...... *H04L 65/1045* (2022.05); *H04L 65/1016* (2013.01); *H04L 65/1073* (2013.01);
(Continued)

(58) Field of Classification Search
CPC ..... H04W 76/10; H04W 76/11; H04W 48/14; H04W 8/04; H04L 65/1013; H04L 65/1016; H04L 65/105; H04L 65/1073
See application file for complete search history.

(56) References Cited

U.S. PATENT DOCUMENTS 8,099,377 B2 *  1/2012  Zhou ....................... H04L 12/14
                                                         706/47
9,392,471 B1 *  7/2016  Thomas ................ H04W 24/02
(Continued)

FOREIGN PATENT DOCUMENTS

CN          101426261 A       5/2009
CN          101494890 A       7/2009
(Continued)

OTHER PUBLICATIONS

3rd Generation Partnership Project; Technical Specification Group Services and System Aspects; IP Multimedia Subsystem (IMS); Stage 2 (Release 15), 3GPP TS 23.228 V15.1.0 (Dec. 22, 2017), pp. 1-329.
(Continued)

*Primary Examiner* — Jenee Holland
(74) *Attorney, Agent, or Firm* — Slater Matsil, LLP

(57) ABSTRACT

Embodiments provide a service request processing method, a related device, and a communications system in an IMS network. In some embodiments, because 5GC network slices correspond to different services, P-CSCFs in the IMS also correspond to different service information. After receiving a terminated service request sent by an I-CSCF, a first S-CSCF can obtain an address of a corresponding P-CSCF based on terminated service information carried in the terminated service request. Then, the first S-CSCF sends
(Continued)

the terminated service request to the P-CSCF corresponding to the address, and the P-CSCF processes the terminated service request.

15 Claims, 4 Drawing Sheets

(51) Int. Cl.
    *H04L 65/1073* (2022.01)
    *H04L 65/1101* (2022.01)
    *H04W 8/04* (2009.01)
    *H04W 48/14* (2009.01)
    *H04W 76/11* (2018.01)
    *H04L 9/40* (2022.01)
    *H04W 8/20* (2009.01)
    *H04L 65/1069* (2022.01)
    *H04W 48/18* (2009.01)
    *H04W 60/00* (2009.01)
    *H04W 40/00* (2009.01)
    *H04L 65/1066* (2022.01)

(52) U.S. Cl.
    CPC .......... *H04L 65/1101* (2022.05); *H04W 8/04* (2013.01); *H04W 48/14* (2013.01); *H04W 76/11* (2018.02)

(56) References Cited

U.S. PATENT DOCUMENTS

| | | | |
|---|---|---|---|
| 9,667,665 B1 * | 5/2017 | Paczkowski | H04L 9/40 |
| 9,781,259 B1 * | 10/2017 | Kodaypak | H04W 4/023 |
| 2006/0035637 A1 * | 2/2006 | Westman | H04W 8/08 |
| | | | 455/435.3 |
| 2006/0153353 A1 | 7/2006 | O'Neil | |
| 2006/0256748 A1 * | 11/2006 | Jung | H04L 65/1009 |
| | | | 370/328 |
| 2007/0113086 A1 * | 5/2007 | Huang | H04L 29/12188 |
| | | | 713/168 |
| 2007/0124438 A1 * | 5/2007 | Park | H04L 29/06027 |
| | | | 709/223 |
| 2007/0189215 A1 * | 8/2007 | Wu | H04W 8/12 |
| | | | 370/331 |
| 2007/0243876 A1 * | 10/2007 | Duan | H04L 65/1069 |
| | | | 455/445 |
| 2008/0168540 A1 * | 7/2008 | Agarwal | H04L 45/72 |
| | | | 726/5 |
| 2008/0268819 A1 * | 10/2008 | Zhu | H04W 48/18 |
| | | | 455/414.1 |
| 2008/0316931 A1 * | 12/2008 | Qiu | H04L 41/5009 |
| | | | 370/245 |
| 2009/0023443 A1 * | 1/2009 | Kieselmann | H04L 63/08 |
| | | | 455/433 |
| 2009/0161853 A1 * | 6/2009 | Ku | H04L 65/1016 |
| | | | 379/207.16 |
| 2010/0150137 A1 * | 6/2010 | Lu | H04L 65/1016 |
| | | | 370/352 |
| 2010/0150145 A1 * | 6/2010 | Ku | H04L 12/66 |
| | | | 370/356 |
| 2010/0189072 A1 * | 7/2010 | Vikberg | H04L 65/1069 |
| | | | 370/331 |
| 2011/0028130 A1 * | 2/2011 | Swaminathan | H04M 3/42195 |
| | | | 455/414.1 |
| 2011/0161519 A1 * | 6/2011 | Siegel | H04L 65/1016 |
| | | | 709/238 |
| 2011/0310889 A1 * | 12/2011 | Merino Vazquez | |
| | | | H04L 65/1016 |
| | | | 370/352 |
| 2012/0011273 A1 * | 1/2012 | Van Elburg | H04L 67/306 |
| | | | 709/238 |
| 2012/0184244 A1 * | 7/2012 | Cai | H04M 15/57 |
| | | | 455/408 |
| 2013/0272253 A1 | 10/2013 | Veenstra et al. | |
| 2014/0334480 A1 * | 11/2014 | Lu | H04L 65/1073 |
| | | | 370/352 |
| 2015/0264359 A1 * | 9/2015 | Vanam | H04L 65/70 |
| | | | 375/240.27 |
| 2015/0326619 A1 * | 11/2015 | Lau | H04L 65/1016 |
| | | | 370/328 |
| 2016/0072666 A1 * | 3/2016 | Hoffmann | H04L 41/00 |
| | | | 370/254 |
| 2016/0094255 A1 * | 3/2016 | Meredith | H04M 11/007 |
| | | | 455/132 |
| 2016/0156678 A1 * | 6/2016 | Li | H04L 65/1083 |
| | | | 370/352 |
| 2017/0127427 A1 * | 5/2017 | Claridge | H04W 48/16 |
| 2017/0353429 A1 * | 12/2017 | Le Rouzic | H04L 61/2564 |
| 2017/0367081 A1 * | 12/2017 | Cui | H04L 41/0816 |

FOREIGN PATENT DOCUMENTS

| | | |
|---|---|---|
| CN | 101931900 A | 12/2010 |
| CN | 101931901 A | 12/2010 |
| CN | 102104862 A | 6/2011 |
| CN | 102752879 A | 10/2012 |
| EP | 2372966 A1 | 10/2011 |

OTHER PUBLICATIONS

Agrawal P. et al., "IP Multimedia Subsystems in 3GPP and 3GPP2: Overview and Scalability Issues", IEEE Communications Magazine, vol. 46, No. 1, Jan. 1, 2008, pp. 138-145.
T-Mobile USA Inc., "Network Slicing and IMS Interactions", SA WG2 Meeting #120 S2-172029, Busan, South Korea, Mar. 27-31, 2017, 3 pages.

* cited by examiner

SERVICE REQUEST PROCESSING METHOD, APPARATUS, AND COMMUNICATIONS SYSTEM

CROSS-REFERENCE TO RELATED APPLICATIONS

This application is a continuation application of PCT/CN2018/119262, filed on Dec. 5, 2018, which claims priority to Chinese Patent Application No. 201711489721.3, filed on Dec. 29, 2017, The disclosures of the aforementioned applications are hereby incorporated by reference in their entireties.

TECHNICAL FIELD

The present invention relates to the field of communications technologies, and in particular, to a service request processing method, a related apparatus, and a communications system.

BACKGROUND

A 5th generation (5G) network is a next-generation network to be deployed as expected by a network operator, and features a high rate and a low latency. Network slicing (slice) is one of features provided by the 5G network, and can meet different service requirements by slicing the 5G network into different network slices. User equipment (UE) can select corresponding 5G core network slices (5GC slices) based on different service requirements, and initiate different services.

A service-call session control function (S-CSCF) device in an IP multimedia subsystem (IMS) network is mainly configured to receive a terminated service request for the UE and then route the terminated service request to a proxy-call session control function (P-CSCF) device, in an IMS network, with which the UE currently registers. Further, the P-CSCF can send the terminated service request to the UE for processing.

However, when accessing the IMS network through different 5GC network slices, the UE performs a plurality of times of registration in the IMS network through different P-CSCFs, and each time of registration corresponds to one 5GC network slice. After the registration succeeds, a user can initiate different IMS services in the different 5GC network slices. However, the prior art does not resolve a technical problem of how the S-CSCF in the IMS sends a terminated service request for the UE to a corresponding P-CSCF for processing after the UE accesses the IMS through the different 5GC network slices.

SUMMARY

Embodiments of this application provide a method, a related apparatus, and a system, so that a terminated service request for UE can be sent to a corresponding P-CSCF for processing in a case of 5GC network slicing.

According to a first aspect, an embodiment of this application provides a terminated service request processing method, applied to a first S-CSCF in an IMS network and including: receiving a terminated service request sent by an interrogating-call session control function (I-CSCF) device, where the terminated service request carries terminated service information; and determining an address of a P-CSCF that corresponds to the terminated service information, and then sending the terminated service request to the P-CSCF.

In this embodiment, because 5GC network slices correspond to different services, P-CSCFs in the IMS also correspond to different service information. After receiving the terminated service request sent by the I-CSCF, the first S-CSCF can obtain the address of the corresponding P-CSCF based on the terminated service information carried in the terminated service request. Then, the first S-CSCF sends the terminated service request to the P-CSCF corresponding to the address, and the P-CSCF processes the terminated service request. This embodiment resolves a technical problem of how an S-CSCF in the IMS sends a terminated service request for UE to a corresponding P-CSCF for processing after the UE accesses the IMS through different 5GC network slices.

In a possible solution, the terminated service request further carries an identity of terminated user equipment UE. In this case, the first S-CSCF determines the address of the proxy-call session control function P-CSCF device that corresponds to the terminated service information and the identity of the terminated UE, and sends the terminated service request to the P-CSCF. The foregoing solution may be applied to a scenario in which one 5GC network slice includes a plurality of P-CSCFs. In this case, different UEs register with different P-CSCFs in 5GC network.

In a possible solution, that the first S-CSCF determines the address of the P-CSCF that corresponds to the terminated service information and the identity of the terminated UE includes: sending, by the first S-CSCF, a query request message to a home subscriber server HSS, where the query request message is used to query for the address of the P-CSCF that corresponds to the identity of the terminated UE and the terminated service information, and the query request message carries the identity of the terminated UE and the terminated service information; and then receiving a query response message from the HSS, where the query response message carries the address of the P-CSCF that corresponds to the identity of the terminated UE and the terminated service information. In this solution, the first S-CSCF sends the query request message to the HSS, to determine the address of the proxy-call session control function P-CSCF device that corresponds to the terminated service information and the identity of the terminated UE. In this way, when the first S-CSCF does not have data related to the terminated UE (for example, after an S-CSCF with which the UE initially registers is faulty, the first S-CSCF is a reselected S-CSCF), the first S-CSCF may obtain the address of the corresponding P-CSCF from the HSS, and may further send the terminated service request to the P-CSCF, to continue an IMS terminated service.

In an optional solution, that the first S-CSCF determines the address of the P-CSCF that corresponds to the service information and the identity of the terminated UE in the terminated service request may further include: querying a local correspondence for the address of the P-CSCF that corresponds to the service information and the identity of the terminated UE in the terminated service request.

In an optional solution, after receiving the terminated service request, the first S-CSCF may determine whether the first S-CSCF has data of the terminated UE. If the first S-CSCF has the data of the terminated UE, the first S-CSCF queries a correspondence locally to obtain the address of the P-CSCF. If the first S-CSCF has no data of the terminated UE, the first S-CSCF queries the HSS for the address of the P-CSCF.

In an optional solution, before the first S-CSCF receives the terminated service request sent by the I-CSCF, the first S-CSCF may further receive a registration message of the terminated UE that is sent by the I-CSCF, where the registration message carries the identity of the terminated UE, service information of a service provided by a 5G core network slice, and the address of the P-CSCF. Then, the first S-CSCF locally stores a correspondence between the identity of the terminated UE, the service information of the service provided by the 5G core network slice, and the address of the P-CSCF. Further, after receiving the terminated service request, the first S-CSCF may query the correspondence, and send the terminated service request of the UE to the corresponding P-CSCF for service processing.

In an optional solution, the first S-CSCF further sends the identity of the terminated UE, the service information of the service provided by the 5G core network slice, and the address of the P-CSCF to the HSS. In this solution, the HSS can store the correspondence to back up the correspondence. Therefore, when the first S-CSCF is faulty, the correspondence may be sent to a reselected S-CSCF, to implement fault recovery, thereby ensuring continuity of an IMS service.

In an optional solution, the first S-CSCF is an S-CSCF that provides a service for the UE, and may be the S-CSCF with which the UE initially registers, or may be the S-CSCF reselected by the IMS network after the S-CSCF with which the UE initially registers is faulty.

In an optional solution, before the first S-CSCF receives the terminated service request sent by the I-CSCF, the I-CSCF receives a terminated service request sent by an external network (a network other than the IMS network), and determines that an initial S-CSCF with which the terminated UE in the terminated service request registers is faulty. Then, the I-CSCF sends the terminated service request to the first S-CSCF, to trigger the first S-CSCF to process the terminated service request. In this solution, to distinguish from the initial S-CSCF with which the UE registers, the first S-CSCF currently serves the UE, and the first S-CSCF is not faulty.

According to a second aspect, this application provides a service-call session control function device, including a receiving module, a determining module, and a sending module. The receiving module is mainly configured to receive a terminated service request sent by an interrogating-call session control function I-CSCF device, where the terminated service request carries an identity of terminated user equipment UE and terminated service information. The determining module is mainly configured to determine an address of a proxy-call session control function P-CSCF device that corresponds to the terminated service information and the identity of the terminated UE. The sending module is mainly configured to send the terminated service request to the P-CSCF.

In an optional solution, the determining module in an S-CSCF includes: a sending submodule, configured to send a query request message to a home subscriber server HSS, where the query request message is used to query for the address of the P-CSCF that corresponds to the identity of the terminated UE and the terminated service information, and the query request message carries the identity of the terminated UE and the terminated service information; and a receiving submodule, configured to receive a query response message returned by the HSS, where the query response message carries the address of the P-CSCF that corresponds to the identity of the terminated UE and the terminated service information.

In an optional solution, that the determining module in the S-CSCF determines an address of a P-CSCF that corresponds to the service information and the identity of the terminated UE in the terminated service request includes: querying a local correspondence for the address of the P-CSCF that corresponds to the service information and the identity of the terminated UE in the terminated service request.

In an optional solution, before receiving the terminated service request sent by the I-CSCF, the receiving module in the S-CSCF is further configured to receive a registration message of the terminated UE that is sent by the I-CSCF, where the registration message carries the identity of the terminated UE, service information of a service provided by a 5G core network slice, and the address of the P-CSCF. The S-CSCF further includes a storage module, configured to store a correspondence between the identity of the terminated UE, the service information of the service provided by the 5G core network slice, and the address of the P-CSCF.

In an optional solution, the sending module in the S-CSCF is further configured to send the identity of the terminated UE and the address of the P-CSCF to the HSS.

According to a third aspect, this application provides a communications system. The communications system mainly includes a first service-call session control function S-CSCF device, an interrogating-call session control function I-CSCF device, and a proxy-call session control function P-CSCF device.

The first S-CSCF is configured to: receive a terminated service request sent by the I-CSCF, where the terminated service request carries an identity of terminated user equipment UE and terminated service information; determine an address of a P-CSCF that corresponds to the terminated service information and the identity of the terminated UE; and send the terminated service request to the P-CSCF.

In an optional solution, the communications system further includes a home subscriber server HSS, and that the first S-CSCF determines an address of a P-CSCF that corresponds to the service information and the identity of the terminated UE in the terminated service request includes: sending a query request message to the HSS, where the query request message is used to query for the address of the P-CSCF that corresponds to the identity of the terminated UE and the terminated service information, and the query request message carries the identity of the terminated UE and the terminated service information; and receiving a query response message sent by the HSS, where the query response message carries the address of the P-CSCF that corresponds to the identity of the terminated UE and the terminated service information.

In an optional solution, before receiving the terminated service request sent by the I-CSCF, the first S-CSCF in the communications system is further configured to: receive a registration message of the terminated UE that is sent by the I-CSCF, where the registration message carries the identity of the terminated UE and the address of the P-CSCF; and store a correspondence between the identity of the terminated UE and the address of the P-CSCF.

In an optional solution, the I-CSCF in the communications system is further configured to: receive the terminated service request, and determine that an initial S-CSCF with which the terminated UE in the terminated service request registers is faulty; and send the terminated service request to the first S-CSCF.

In an optional solution, the first S-CSCF in the communications system may further send the identity of the terminated UE, service information of a service provided by a 5GC network slice, and the address of the P-CSCF to the HSS.

According to a fourth aspect, this application further provides a terminated service request processing method. The method may be implemented by a home subscriber server HSS, and includes: receiving, by the home subscriber server (HSS), a query request message sent by a first S-CSCF, where the query request message carries an identity of terminated UE and terminated service information in a terminated service request; and then determining, by the HSS, an address of a P-CSCF that corresponds to the identity of the terminated UE and the terminated service information, and sending a query response message to the first S-CSCF, where the query response message carries the address of the P-CSCF.

In this embodiment provided in this application, when the first S-CSCF sends the query request message to the HSS, the HSS may send a locally stored correspondence to the first S-CSCF, so that the first S-CSCF may send, based on the correspondence, the terminated service request to the corresponding P-CSCF for processing, to implement an IMS service.

In an optional solution, before the receiving, by the HSS, a query request message sent by a first S-CSCF, the method further includes: receiving the identity of terminated UE that is sent by the S-CSCF, service information of a service provided by a 5GC network slice, and the address of the P-CSCF with which the terminated UE registers; and storing a correspondence between the identity of the terminated UE, the service information of the service provided by the 5GC network slice, and the address of the P-CSCF with which the terminated UE registers, to facilitate subsequent query for the correspondence.

According to a fifth aspect, this application provides a user equipment registration method, applied to user equipment UE and mainly including: first obtaining, by the UE, service information of a service provided by a 5G core network slice and an address of a proxy-call session control function P-CSCF device in an IMS network; and then sending a registration message to the P-CSCF based on the address, where the registration message carries the service information of the service provided by the 5G core network slice or an identity of the 5G core network slice. The registration message sent by the UE is sent by the P-CSCF in the IMS network to an S-CSCF, and then is sent by the S-CSCF to an HSS. Therefore, the S-CSCF and the HSS each can store a correspondence between the service information of the service provided by the 5GC network slice and the P-CSCF in the IMS network, and the correspondence corresponds to that in the first aspect. This helps the S-CSCF subsequently query for the P-CSCF corresponding to the service information, to resolve a technical problem that an incoming service request is incorrectly routed in a 5GC network slicing scenario.

In a possible solution, the obtaining, by the UE, service information of a service provided by a 5G core network slice includes: when attaching to the 5G core network slice, obtaining, by the UE from the 5G core network (for example, an AMF), the service information of the service provided by the 5G core network slice.

In a possible solution, the user equipment UE adds the service information to a header field of the registration message.

In a possible solution, the obtaining, by the UE, an address of a proxy-call session control function P-CSCF device in an IMS network includes: when establishing a PDU session with the 5G core network slice, obtaining, by the UE from the 5G core network slice (for example, an AMF), the address of the proxy-call session control function P-CSCF device in the IMS network.

In an optional solution, the user equipment may obtain service information of a service request initiated by a user, and then send the service request to a P-CSCF corresponding to the service information. In this way, the user equipment may process the service request actively initiated by the user, and send the service request to the P-CSCF corresponding to the service information for processing.

According to a sixth aspect, an embodiment of this application provides an S-CSCF, and the S-CSCF may be implemented by a general-purpose computer. The S-CSCF may include a memory, a processor, an input/output device, and the like. The memory stores program code, and the processor can obtain and execute the program code stored in the memory, so that the S-CSCF can perform the communication method provided in the first aspect. For a specific execution process, refer to the first aspect.

According to a seventh aspect, an embodiment of this application provides an HSS, and the HSS may be implemented by a general-purpose computer. The HSS may include a memory, a processor, an input/output device, and the like. The memory stores program code, and the processor can obtain and execute the program code stored in the memory, so that the HSS can perform the communication method provided in the fourth aspect. For a specific execution process, refer to the fourth aspect.

In the solution provided in any one of the foregoing aspects, the service request may be an invitation message, and the identity of the UE may be an IP address of the UE, or may be an IP multimedia private identity (IMPI) or an IP multimedia public identity (IMPU) of the user. The query request message may be specifically a server assignment request message, and the query response message may be a server assignment answer message.

DETAILED DESCRIPTION OF ILLUSTRATIVE EMBODIMENTS

Figure 1:
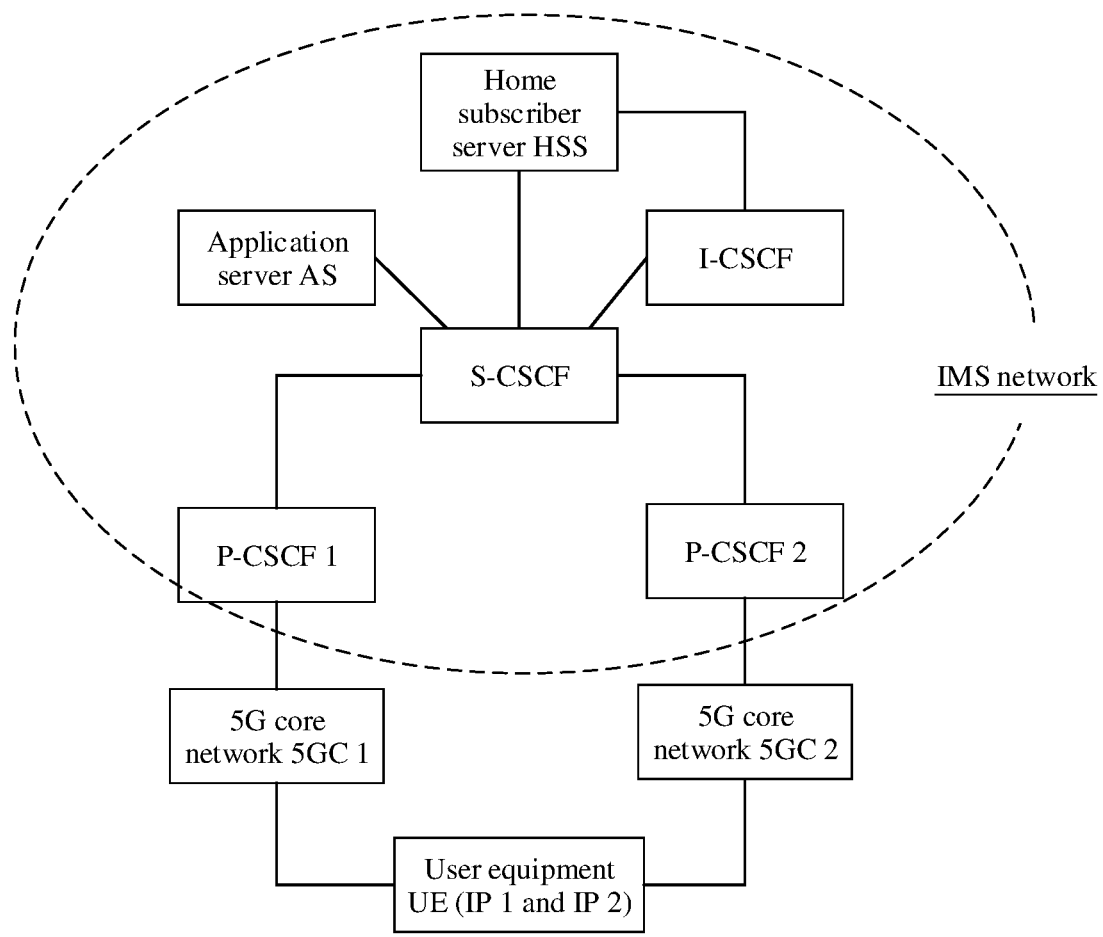
FIG. 1 is a schematic networking diagram of a communications system according to Embodiment 1 of this application.

This application provides a service request processing method, a related apparatus, and a system. FIG. 1 is a schematic networking diagram of a communications system according to Embodiment 1.

As shown in FIG. 1, the communications system provided in this embodiment includes user equipment (UE) and a network side device. The network side device may include a 5G core network (5GC) that performs mobility management, user plane control, and the like on the user equipment accessing a 5G network, and an IMS network that provides an IMS service for the user equipment.

The 5GC is capable of perform network slicing. For example, the 5GC is sliced into a 5GC 1 and a 5GC 2. The 5GC may be sliced according to principles such as a service type, a user type, a user level, and a number segment. This is not limited in this embodiment of this application. Different 5GC network slices (which may also be briefly referred to as 5G network slices or 5GC slices) may provide different services. For example, the 5GC 1 provides a voice call service, and the 5GC 2 provides a public safety trunking service.

Devices in the 5GC include an access and mobility management function (AMF) device that performs access and mobility management on the UE, a session management function (SMF) device that manages a session of the UE, and a user plane function (UPF) device that controls a user plane of the UE. In addition, the 5GC further includes another device, for example, a device that performs a policy control function. This is not limited in this embodiment.

Devices in the IMS may include a proxy-call session control function 1 (P-CSCF 1) device, a proxy-call session control function 2 (P-CSCF 2) device, a service-call session control function (service-call session control function, S-CSCF) device, an interrogating-call session control function (I-CSCF) device, an application server (AS), and a home subscriber server (HSS). The P-CSCF 1 accesses the 5GC 1, and the P-CSCF 2 accesses the 5GC 2. The HSS is mainly configured to store user profile data, and a function of the HSS may alternatively be implemented by a unified device management (UDM) device.

After the UE is powered on, the UE can access the 5GC 1 and the 5GC 2, to obtain two IP addresses (an IP 1 and an IP 2). The IP 1 corresponds to the 5GC 1, and the IP 2 corresponds to the 5GC 2. The UE further establishes a packet data unit (PDU) session in each of the 5GC 1 and the 5GC 2. In a process of establishing the PDU session, the UE obtains an address of the P-CSCF 1 in the IMS and an address of the P-CSCF 2 in the IMS from the 5GC 1 and the 5GC 2, respectively. Then, the UE uses the IP 1 to initiate IMS registration to the P-CSCF 1, and uses the IP 2 to initiate IMS registration to the P-CSCF 2. After the registration is completed, the UE can initiate an IMS service in each of the two 5GC network slices. For example, the UE initiates a virtual reality (VR) service or a public safety trunking service in the 5GC 1, and initiates a voice call service or an augmented reality (AR) service in the 5GC 2.

In this embodiment, when the UE initiates IMS registration in the 5GC 1, a registration message sent to the P-CSCF 1 carries service information 1 (or briefly referred to as terminated service information, for example, the service type or a service identity) of a service provided by the 5GC 1. Then, the P-CSCF 1 sends the service information 1 to the S-CSCF, so that the S-CSCF can store a correspondence between the service information 1 and the P-CSCF 1. Similarly, when the UE initiates IMS registration in the 5GC 2, a registration message sent to the P-CSCF 2 also carries service information 2 of a service provided by the 5GC 2, and the S-CSCF also stores a correspondence between the service information 2 and the P-CSCF 2. Further, when the S-CSCF in the IMS network subsequently receives a terminated (or referred to as incoming) service request, the S-CSCF may determine a corresponding P-CSCF based on service information in the terminated service request (also referred to as a terminated service request message). Then, the terminated service request is sent to the corresponding P-CSCF, and the P-CSCF sends the terminated service request to the UE for processing.

In this embodiment, because 5G network slices correspond to different services, corresponding P-CSCFs in the IMS also correspond to different service information. After receiving a terminated service request sent by the I-CSCF, the S-CSCF can obtain an address of the P-CSCF corresponding to information based on terminated service information carried in the terminated service request. Then, the S-CSCF sends the terminated service request to the P-CSCF corresponding to the address. This embodiment resolves a technical problem of how the S-CSCF in the IMS sends the terminated service request for the UE to the corresponding P-CSCF for processing after the UE accesses the IMS through different 5G network slices. This avoids an IMS service failure caused because a service request is routed to an incorrect P-CSCF, and improves stability and efficiency of the communications system.

Figure 2:
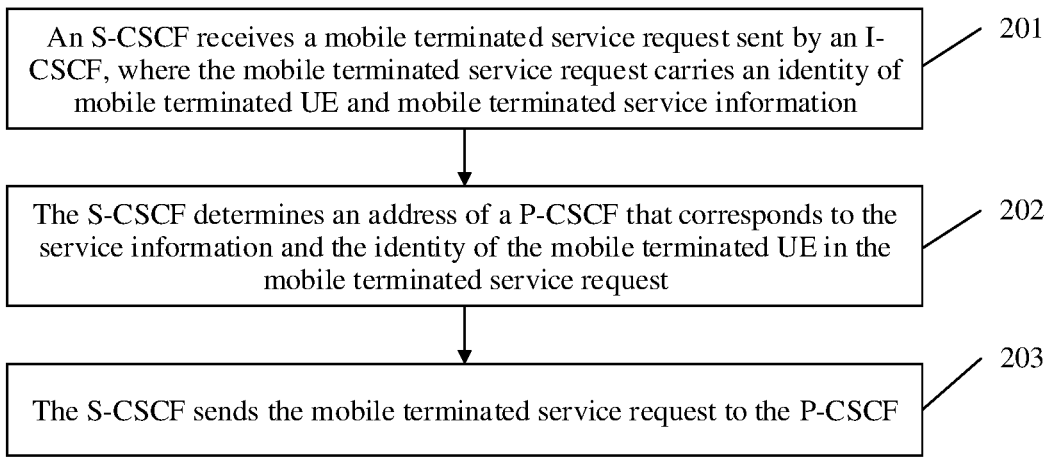
FIG. 2 is a flowchart of a service request processing method according to Embodiment 2 of this application.

Based on the foregoing communications system, an embodiment provides a terminated service request processing method. FIG. 2 is an implementation flowchart of a terminated service request processing method according to Embodiment 2 of this application.

In the communication method provided in this embodiment, an I-CSCF in an IMS network receives an incoming terminated service request for user equipment, and the I-CSCF sends the terminated service request to an S-CSCF (corresponding to the first S-CSCF in the summary). The S-CSCF may perform the following steps.

Step 201: The S-CSCF receives the terminated service request sent by the I-CSCF, where the terminated service request carries an identity of terminated UE and terminated service information.

The S-CSCF may receive, through a Mw interface, the terminated service request sent by the I-CSCF, where the request carries the identity of the terminated UE and the terminated service information.

The identity of the UE may be an address of the UE, for example, an IP address of the UE, a session initiation protocol address of the UE, an international mobile equipment identity (IMEI) of the UE, or a physical address of the UE, or may be an identity of a terminated user, for example, an IP multimedia private identity (IMPI), an IP multimedia public identity (IMPU), or a mobile station integrated services digital network number (MSISDN). Therefore, the identity of the UE may be represented in different forms in all the embodiments provided in this application, and all the different forms can be used to identify the UE. All these possible replacements are included in the embodiments of this application. For example, the identity of the UE in step 201 may be the session initiation protocol address of the UE. The identity carried in the registration message sent by the UE may be the IMPU or an IP address of the UE in a 5G network.

In addition, there may be a plurality of identities of the UE in all the embodiments of this application, that is, may be a plurality of specific identities. For example, the terminated service request may carry the SIP address and the MSISDN of the UE.

In addition, the terminated service information may be a service type or a service identity.

Step 202: The S-CSCF determines an address of a P-CSCF that corresponds to the service information and the identity of the terminated UE in the terminated service request.

The S-CSCF may locally store a correspondence between service information of a service provided by a 5GC network slice, the identity of the terminated UE, and the address of the P-CSCF with which the terminated UE registers, and further locally query the correspondence after receiving the terminated service request, to obtain the address of the P-CSCF that corresponds to the service information and the identity of the terminated UE that are carried in the terminated service request. The service information carried in the terminated service request may also be briefly referred to as the terminated service information. Because different 5GC network slices correspond to different P-CSCFs, the P-CSCF with which the terminated UE registers may be referred to as a P-CSCF corresponding to the 5GC network slice.

In addition, the S-CSCF may further query another device, such as an HSS, in the IMS network for the address of the P-CSCF that corresponds to the service information and the identity of the terminated UE in the terminated service request.

In this embodiment, after receiving the terminated service request, the S-CSCF may determine whether the S-CSCF has data of the terminated UE. If the S-CSCF has data of the terminated UE, the S-CSCF queries the correspondence locally to obtain the address of the P-CSCF. If the S-CSCF has no data of the terminated UE, the S-CSCF queries the HSS for the address of the P-CSCF.

Step 203: The S-CSCF sends the terminated service request to the P-CSCF.

In this embodiment, the S-CSCF obtains the address of the P-CSCF that corresponds to the service information and the identity of the UE in the terminated service request. Therefore, the S-CSCF can send the terminated service request to the corresponding P-CSCF, and the P-CSCF processes the terminated service request. This implements processing of a terminated service request in a 5GC slicing scenario.

In this embodiment, when the terminated user equipment UE initiates IMS registration in the 5GC network slice, the S-CSCF may receive the registration (register) message of the UE that is sent by the I-CSCF. A header field of the registration message carries the identity of the terminated UE, the service information of the service provided by the 5GC network slice, and the address of the P-CSCF. In this case, the S-CSCF stores the correspondence between the identity of the terminated UE, the service information of the service provided by the 5GC network slice, and the address of the P-CSCF, and subsequently queries the correspondence for the address of the P-CSCF corresponding to the service information.

Figure 3:
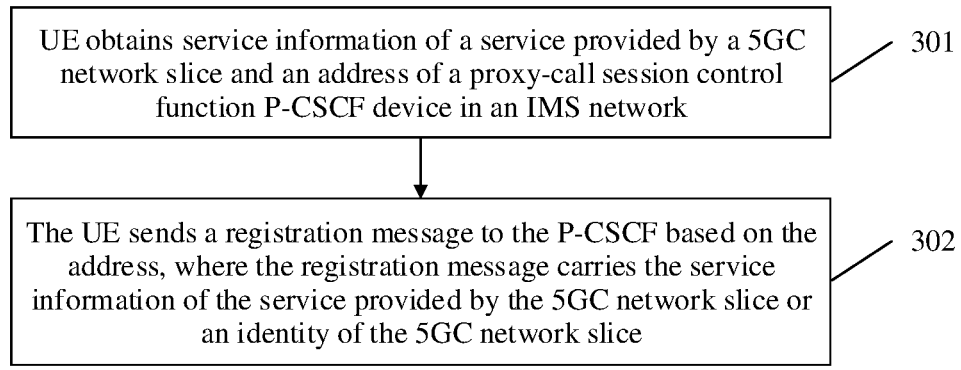
FIG. 3 is a flowchart of an IMS registration method according to Embodiment 3 of this application.

FIG. 3 is an implementation flowchart of an IMS registration method according to Embodiment 3 of this application.

The IMS registration method provided in this embodiment of this application is mainly applied to user equipment, and the method includes the following steps.

Step 301: The UE obtains service information of a service provided by a 5GC network slice and an address of a proxy-call session control function P-CSCF device in an IMS network.

When attaching to the 5GC network slice, the user equipment may obtain, from the 5G core network (for example, an AMF), the service information of the service provided by the 5GC network slice. In addition, after attaching to the 5GC network slice, the UE may establish a PDU session with the 5GC network slice, and obtain, from the 5GC in a process of establishing the PDU session, the address of the P-CSCF corresponding to the 5GC network slice.

Because the user equipment may attach to a plurality of 5GC network slices, the UE may locally store correspondences between service information of services provided by the plurality of 5GC network slices and an address of a P-CSCF corresponding to the 5GC network slices.

Step 302: The UE sends a registration message to the P-CSCF based on the address, where the registration message carries the service information of the service provided by the 5GC network slice or an identity of the 5GC network slice.

The UE may generate the registration message (which may also be referred to as a registration request), and then send the registration message to the P-CSCF in the IMS network through a 5GC 1, where the registration message carries the service information of the service provided by the 5GC network slice. In addition, the registration message may further carry an IP address of the UE in the 5GC network slice. In this embodiment, the 5GC network slice corresponds to the service provided by the 5GC network slice. Therefore, the service information of the service provided by the 5GC network slice in the registration message may also be the identity of the 5GC network slice. Further, after receiving the registration message that carries the identity of the 5GC network slice, the P-CSCF or an S-CSCF in the IMS network may associate the registration message with the service information of the service provided by the 5GC network slice.

In addition, the registration message sent by the UE may further carry an identity of the UE, for example, an IP address and/or an IMPU of the UE.

In this embodiment, after the UE sends, to the P-CSCF, the registration message that carries the service information of the service provided by the 5GC network slice, the P-CSCF may send the registration message to the S-CSCF in the IMS network. Then, the S-CSCF may store a correspondence between the service information, the identity of the UE, and the P-CSCF, and subsequently query for an address of a P-CSCF corresponding to the service information. In this way, the incoming service request is routed to the P-CSCF corresponding to the service information for processing, to continue IMS service processing.

Further, after completing IMS registration through the 5GC 1, the UE may further complete second IMS registration through a 5GC 2. Then, the UE may initiate a service in the 5GC 1 or the 5GC 2. A related service request is sent to the P-CSCF through the 5GC 1 or the 5GC 2, and then the P-CSCF forwards the service request to the S-CSCF in the IMS network. For example, the UE initiates a low-latency service such as an AR/VR service in the 5GC 1. The UE initiates a public safety trunking service such as a mission-critical push-to-talk (mission-critical push-to-talk, MCPTT) service in the 5GC 2.

Figure 4:
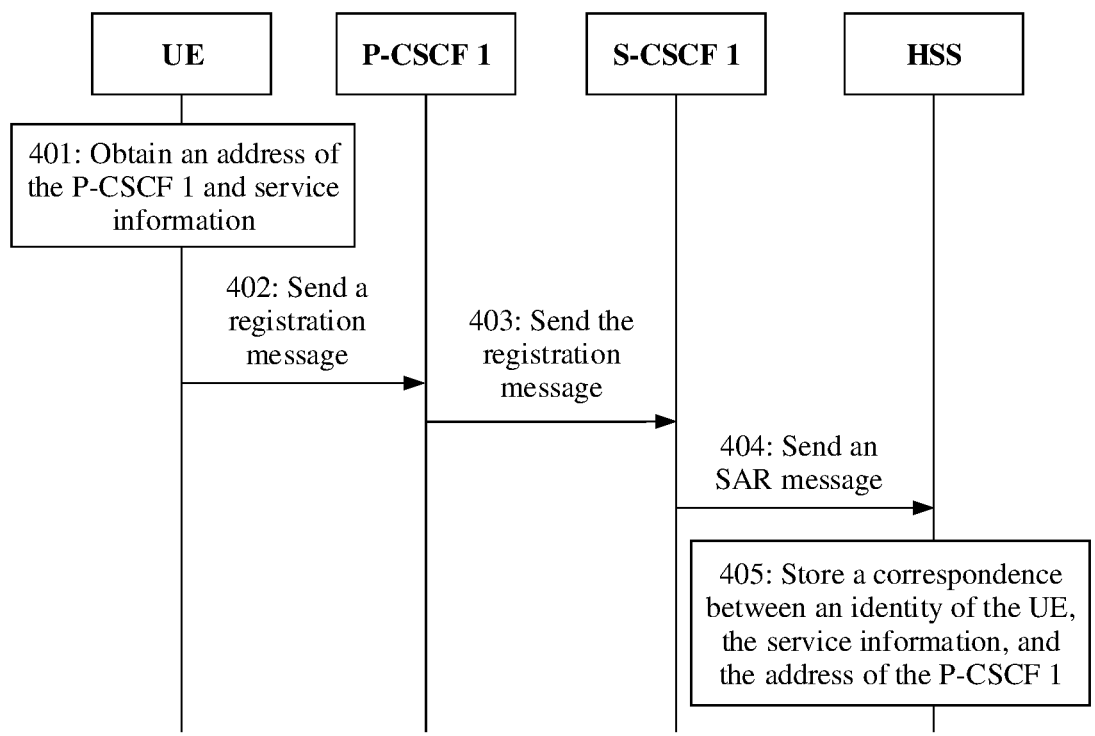
FIG. 4 is a flowchart of a service request processing method according to Embodiment 4 of this application.

For a further understanding of this application, an embodiment of this application further provides an implementation procedure of a service request processing method. Referring to FIG. 4, the service request processing method provided in Embodiment 4 of this application specifically includes the following steps.

Step 401: UE obtains an address of a proxy-call session control function P-CSCF 1 device in an IMS network and service information of a service provided by a 5GC network slice.

In this embodiment, the service information may be a service type or a service identity. The service type may include a low-latency service (for example, an augmented reality AR service or a VR service), a voice call service, a short messaging service, a public safety trunking service, and the like. The service identity may be an identity of an application APP. It should be noted that the service provided by the 5GC network slice is usually a service that can be initiated or received by the UE. Therefore, the service information of the service provided by the 5GC network slice may also be referred to as service information of the UE. In addition, the service provided by the 5GC network slice may be the same as a service provided by the IMS network. For example, a voice service needs to be supported by both the 5GC network slice and the IMS network.

When the UE attaches to a 5GC, the 5GC may deliver slice IDs of all 5GC network slices supported by the network to the UE. Then, the UE selects different 5GC network slices based on a capability or service information of the UE. Alternatively, the 5GC may specify a 5GC network slice that the UE needs to select. Different 5GC network slices provide different IP addresses for the UE. In this embodiment, there are two slices in the 5GC network, namely, a 5GC 1 and a 5GC 2. An address provided by the 5GC 1 for the UE is an IP 1, and an address provided by the 5GC 2 for the UE is an IP 2.

In this embodiment, different 5GC network slices may provide different services. The UE may attach to both the 5GC network slices, and locally establish a correspondence between the service information of the service provided by the 5GC network slice and the 5GC network slice.

In this embodiment, the UE may obtain an address of a P-CSCF 1 in the IMS network from the 5GC in a process of establishing a PDU session with the 5GC network slice. Specifically, the UE may obtain the address of the P-CSCF 1 in the IMS network from an AMF or an SMF in the 5GC.

In addition, the UE may alternatively locally obtain the address of the P-CSCF 1 in a local configuration manner. For example, both the address of the P-CSCF 1 in the IMS network and the service information of the service provided by the 5GC network slice are configured in a subscriber identity module (SIM) of the UE, and the UE may locally obtain the address of the P-CSCF 1 and the service information. A process of obtaining the address of the P-CSCF 1 by the UE may also be referred to as P-CSCF 1 discovery.

Step 402: The UE sends a registration message to the P-CSCF 1 based on the address of the P-CSCF 1, where the registration message carries the service information of the service provided by the IMS network.

In this embodiment, for example, the UE initiates IMS registration (that is, initiates registration to the P-CSCF 1) in the 5GC network slice 5GC 1. This process is the same as a process in which the UE initiates the IMS registration in the 5GC network slice 5GC 2. In this embodiment, the UE may use one IP multimedia private identity (IMPI) and one IP multimedia public identity (IMPU) to initiate IMS registration in the two 5GC network slices. The UE may alternatively use different IMPIs and IMPUs to initiate IMS registration in the two 5GC network slices.

In this embodiment, the UE may locally construct a registration message based on a session initiation protocol (SIP). The registration message carries service information of a service provided by the 5GC network slice 5GC 1, and may further carry an identity of the UE. The identity of the UE may be an IP address (namely, the IP 1) of the UE in the 5GC 1 in addition to the aforementioned possibility. The registration message is sent to P-CSCF 1 through the 5GC 1 to continue an IMS registration procedure.

Step 403: The P-CSCF 1 sends the received registration message to the S-CSCF 1.

The P-CSCF 1 may send the received registration message to the S-CSCF 1 through a Mw interface. The registration message sent by the P-CSCF 1 carries the address of the P-CSCF 1, the IP address of the UE, and the service information of the service provided by the 5GC network slice. It should be noted that the IP address of the UE (the IP address of the UE in the 5GC 1) carried in the registration message received by the P-CSCF may be different from an IP address of the UE carried in the registration message sent by the P-CSCF 1. To be specific, the P-CSCF 1 may convert the IP address of the UE carried in the received registration message, and the registration message sent by the P-CSCF 1 to the S-CSCF 1 carries a converted address (for example, an SIP address). There is a correspondence between the IP address of the UE in the 5GC 1 and the foregoing converted address. For ease of description, in this embodiment, the IP address of the UE carried in the registration message received by the P-CSCF 1 and the address of the UE carried in the registration message sent by the P-CSCF 1 to the S-CSCF 1 are collectively referred to as the identity of the UE.

Step 404: The S-CSCF 1 sends, to an HSS, the service information of the service provided by the 5GC network slice, the address of the P-CSCF 1, and the identity of the UE that are carried in the registration message.

The S-CSCF 1 may send a message (which may be specifically a server assignment request (SAR) message) to the HSS. The message carries the service information of the service provided by the 5GC network slice, the identity of the UE, and the address (for example, an IP address) of the P-CSCF 1.

In addition, the S-CSCF 1 may alternatively locally store a correspondence between the service information of the service provided by the 5GC network slice 5GC 1, the identity of the UE, and the address of the P-CSCF 1.

Step 405: The HSS stores the correspondence between the service information of the service provided by the 5GC network slice 5GC 1, the identity of the UE, and the address of the P-CSCF 1.

The HSS may store the received correspondence, and the HSS subsequently queries the correspondence for the address of the P-CSCF 1. In addition, the HSS may further store a correspondence between the UE and an address or a name of the S-CSCF 1, to facilitate subsequent query for the address of the S-CSCF with which the UE registers.

In this embodiment, two times of IMS registration are initiated through the two 5GC network slices. The HSS may store correspondences between service information of services provided by the different 5GC network slices, addresses of the P-CSCF, and identities of the UE. For example, correspondences stored by the S-CSCF 1 and the HSS may be as follows:

| IP addresses of the UE | Addresses of the P-CSCF | Service information |
|---|---|---|
| 232.02.5.30 | 192.125.6.3 | a VR/an AR service |
| 232.02.5.31 | 192.125.6.5 | Voice service |

The two correspondences may be associated by using an IMPU of the UE.

In this embodiment, the HSS may further update a registration status of the UE to registered, and send a server assignment answer (SAA) message to the S-CSCF 1, where the SAA message carries subscription information of the user equipment in the HSS. Then, the S-CSCF 1 may send a registration accept message to the UE, to notify the UE that current IMS registration succeeds.

In the communication method provided in this embodiment, the UE may initiate a VR service in the 5GC 1 after the registration succeeds. In addition, the UE may be used as a terminated party to receive an incoming service request, for example, receive a voice call request initiated by another user.

In this embodiment, the S-CSCF 1 may also be referred to as an S-CSCF with which the UE initially registers. If the S-CSCF 1 is faulty, a service of the S-CSCF1 may be taken over by an S-CSCF 2. The following describes in detail a service request processing method in this scenario.

Figure 5:
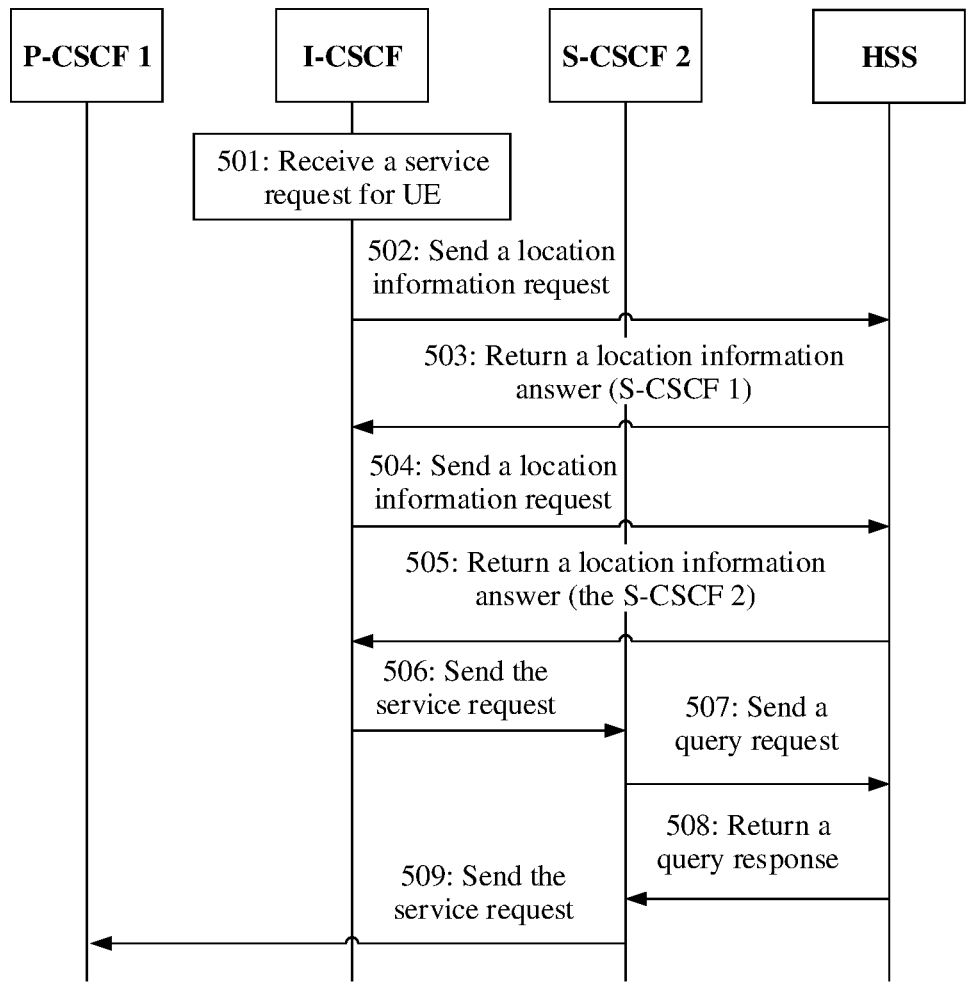
FIG. 5 is a flowchart of a service request processing method according to Embodiment 5 of this application.

Referring to FIG. 5, a service request processing method provided in an embodiment may further include the following steps.

Step 501: An I-CSCF receives a service request.

In this embodiment, the I-CSCF in an IMS network receives a voice call service request. The voice service request may be an invite message, where the invitation message carries an identity of terminated UE, for example, an SIP address or a mobile phone number of UE.

Step 502: The I-CSCF sends a location information request to an HSS, where the location information request is used to query for an address of an S-CSCF in the IMS network.

After receiving the service request, the I-CSCF sends the location information request (LIR) to the HSS, to determine the S-CSCF with which the UE registers. The LIR may further carry the identity of the UE, for example, an IMPI or an IMPU of the UE.

Step 503: The HSS returns a location information answer (LIA), where the location information answer carries an address or a name of the S-CSCF 1.

The HSS locally stores an identity (for example, the address or the name) of the S-CSCF (namely, the S-CSCF 1) with which the UE registers, and after local query, the HSS returns the identity of the S-CSCF 1 to the I-CSCF by using the LIA.

In this embodiment, if the I-CSCF determines that the S-CSCF 1 is faulty, the I-CSCF continues to send a location information request to the HSS, to query for an address of another S-CSCF in the IMS network.

Step 504: The I-CSCF sends the location information request to the HSS, where the location information request is used to query for the address of another S-CSCF in the IMS network.

Step 505: The HSS returns a location information answer, where the location information answer carries an address or a name of the backup S-CSCF 2.

In this embodiment, the HSS determines the backup S-CSCF 2 of the UE, and then sends a response message that carries the address or the name of the backup S-CSCF 2 to the I-CSCF by using the location information answer.

Step 506: The I-CSCF sends the received service request to a device corresponding to the address of the S-CSCF 2 that is carried in the location information answer.

In this embodiment, the I-CSCF forwards the received service request to the S-CSCF 2 in the IMS network, and the S-CSCF2 performs service processing.

Step 507: The S-CSCF 2 sends a query request message to the HSS, where the query request message carries the identity of the UE.

In this embodiment, because the backup S-CSCF 2 determines that the S-CSCF 2 does not store information related to the UE, the backup S-CSCF 2 sends the query request message to the HSS, to obtain backup data of the UE. The query request message may carry the identity of the UE, for example, the IMPU.

In this embodiment, the query request message may be specifically a server assignment request SAR message.

Step 508: The HSS returns a query response message, where the query response message carries a previously stored correspondence between an IP address of the UE, an address of a P-CSCF, and service information of a service provided by a 5GC network slice.

In this embodiment, in step 405, the correspondences between the IP addresses of the UE, the addresses of the P-CSCFs, and the service information of the services provided by the different 5GC network slices are associated by using the IMPU. Therefore, after receiving the query request message that carries the IMPU, the HSS may obtain the previously stored correspondence and send the correspondence to the S-CSCF 2 by using the query response message.

In this embodiment, the query response message may be specifically a server assignment answer (server assignment answer, SAA) message.

Step 509: The S-CSCF 2 sends the service request to the P-CSCF 1.

In this embodiment, the service request is a voice service request. Therefore, the S-CSCF 2 queries the correspondence table based on the identity (IMPU) of the UE and the service information (the voice service), to determine that the IP address of the UE is 232.02.5.31 and the address of the P-CSCF 1 is 192.125.6.5. Then, the S-CSCF 2 sends the service request to the P-CSCF 1 corresponding to 192.125.6.5, to process an incoming (terminated) service request for the UE.

Figure 6:
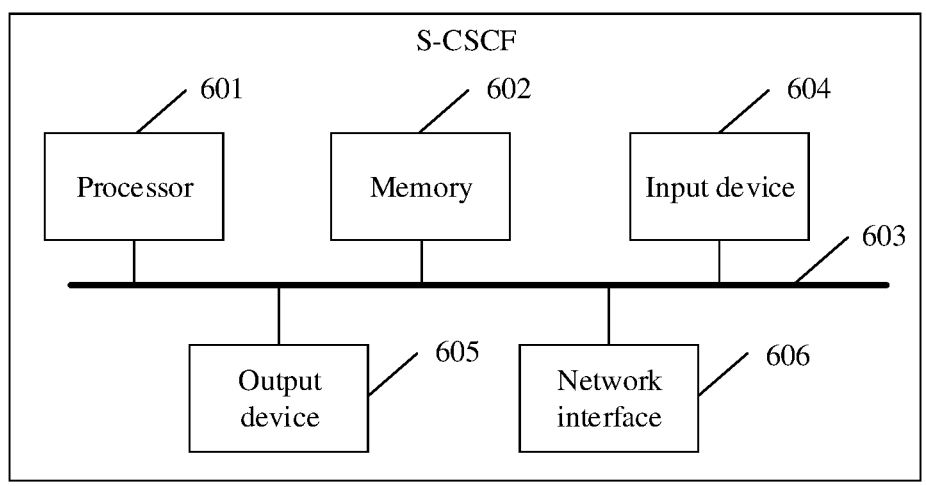
FIG. 6 is a structural diagram of hardware of an S-CSCF according to Embodiment 6 of this application.

FIG. 6 is a structural diagram of hardware of a service-call session control function S-CSCF device according to Embodiment 6 of this application.

The S-CSCF may be implemented by using general-purpose computer hardware, and includes a processor 601, a memory 602, a bus 603, an input device 604, an output device 605, and a network interface 606.

Specifically, the memory 602 may include a computer storage medium in a form of a volatile and/or nonvolatile memory, such as a read-only memory and/or a random access memory. The memory 602 may store an operating system, an application program, another program module, executable code, program data, user profile data, user subscription data, or the like.

The input device 604 may be configured to input a command and information to the S-CSCF, and the input device 604 may be a keyboard or a pointing device, such as a mouse, a trackball, a touchpad, a microphone, a joystick, a game pad, a satellite TV antenna, a scanner, or a similar device. These input devices may be connected to the processor 601 through the bus 603.

The output device 605 may be configured for the S-CSCF to output information. In addition to a monitor, the output device 605 may be another peripheral output device, such as a speaker and/or a printing device. These output devices may also be connected to the processor 601 through the bus 603.

The S-CSCF may be connected to a network through the network interface 606, for example, connected to a local area network (LAN). When the S-CSCF is connected to a network, a computer-executable instruction stored in the S-CSCF may be stored in a remote storage device, and is not limited to being locally stored.

When the processor 601 in the S-CSCF executes the executable code or the application program stored in the memory 602, the S-CSCF can perform the method steps on the S-CSCF side in the foregoing embodiments, for example, perform steps 201 to 203, step 507, and step 509. For a specific execution process, refer to the foregoing embodiments. Details are not described herein again.

Figure 7:
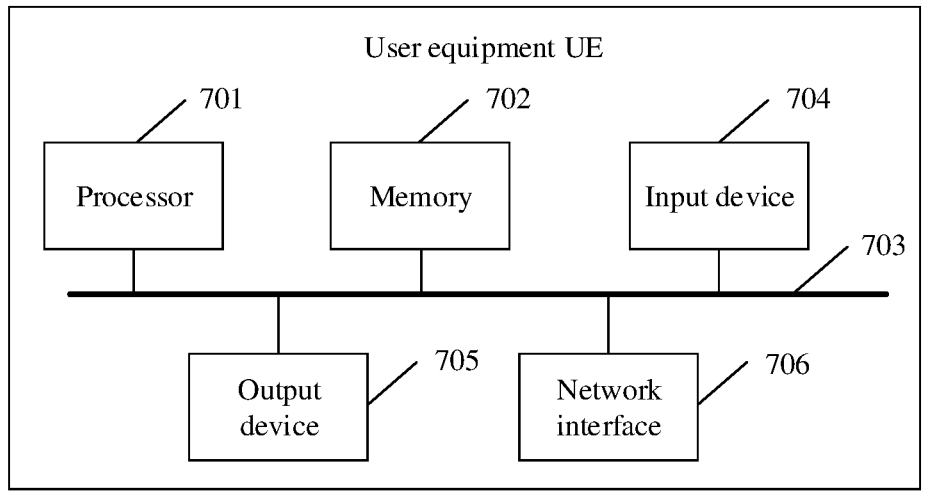
FIG. 7 is a structural diagram of hardware of user equipment according to Embodiment 7 of this application.

FIG. 7 is a schematic structural diagram of user equipment according to Embodiment 7 of this application.

The user equipment mainly includes a processor 701, a memory 702, a bus 703, an input device 704, an output device 705, and a network interface 706. In addition, the user equipment may further include components such as an application processor (AP) and a battery.

Specifically, the memory 702 may include a computer storage medium in a form of a volatile and/or nonvolatile memory, such as a read-only memory and/or a random access memory. The memory 702 may store an operating system, an application program, another program module, executable code, and program data.

The input device 704 may be configured to input a command and information to the user equipment, and the input device 704 may be a keyboard or a pointing device, such as a mouse, a trackball, a touchpad, a microphone, a joystick, a game pad, a disc satellite TV antenna, a scanner, or a similar device. These input devices may be connected to the processor 701 through the bus 703.

The output device 705 may be configured for the user equipment to output information. In addition to a monitor, the output device 705 may be another peripheral output device, for example, a speaker. These output devices may also be connected to the processor 701 through the bus 703.

The user equipment may be connected to a network through the network interface 706, for example, connected to a WI-FI network, a 5G network, or a long term evolution (LTE) network through a radio interface. When the user equipment is connected to a network, a computer-executable instruction stored in the user equipment may be stored in a remote storage device, and is not limited to being locally stored.

When the processor 701 in the user equipment executes the executable code or the application program stored in the memory 702, the user equipment may perform the method steps on the user equipment side in the foregoing embodiments, for example, perform steps 301 and 302 and steps 401 and 402. For a specific execution process and a beneficial effect, refer to the foregoing related embodiments. Details are not described herein again.

Figure 8:
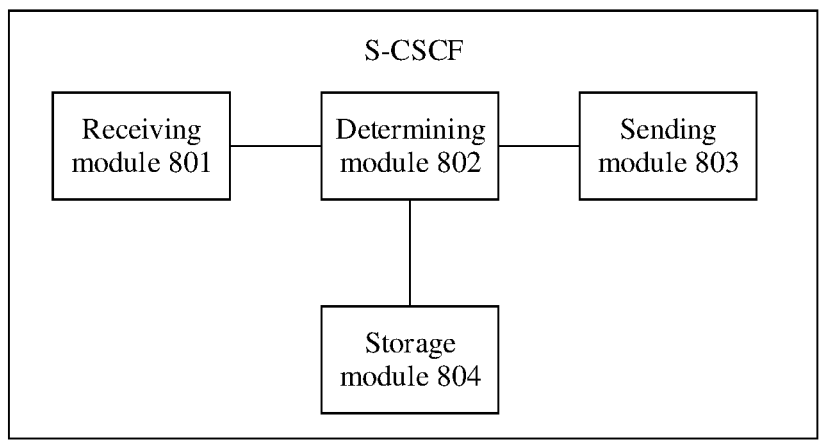
FIG. 8 is a schematic diagram of functional modules of an S-CSCF according to Embodiment 8 of this application.

FIG. 8 is a schematic diagram of functions of a service-call session control function S-CSCF device according to Embodiment 8 of this application.

Figure 9:
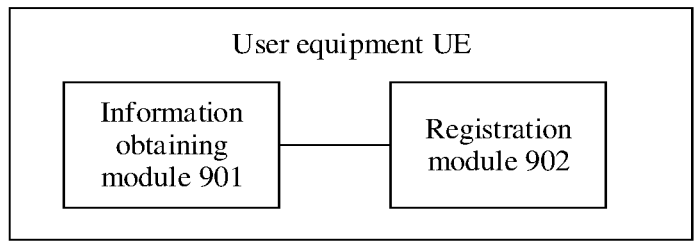
FIG. 9 is a schematic diagram of functional modules of user equipment according to Embodiment 9 of this application.

As shown in FIG. 9, the service-call session control function (S-CSCF) device provided in this embodiment of this application mainly includes a receiving module 801, a determining module 802, and a sending module 803.

The receiving module 801 is configured to receive a terminated service request sent by an interrogating-call session control function (I-CSCF) device, where the terminated service request carries an identity of terminated user equipment UE and terminated service information.

The determining module 802 is configured to determine an address of a P-CSCF that corresponds to the terminated service information and the identity of the terminated UE. That the determining module 802 determines an address of a P-CSCF that corresponds to the terminated service information and the identity of the terminated UE may be implemented by querying a local correspondence for the address of the P-CSCF that corresponds to the terminated service information and the identity of the terminated UE.

The sending module 803 is configured to send the terminated service request to the P-CSCF.

The S-CSCF provided in this embodiment of this application may be used in the foregoing method embodiments, and completes the method steps on the S-CSCF side in the foregoing method embodiments through cooperation of the receiving module 801, the determining module 802, and the sending module 803. Compared with an S-CSCF in the prior art, the S-CSCF provided in this embodiment has the same beneficial effect as the foregoing method embodiments when performing the foregoing communication procedure.

Optionally, the determining module 802 in the S-CSCF may specifically include a sending submodule and a receiving submodule. The sending submodule may be configured to send a query request message to a home subscriber server HSS, where the query request message is used to query for the address of the P-CSCF that corresponds to the identity of the terminated UE and the terminated service information, and the query request message carries the identity of the terminated UE and the terminated service information. The receiving submodule may be configured to receive a query response message returned by the HSS, where the query response message carries the address of the P-CSCF that corresponds to the identity of the terminated UE and the terminated service information. In this embodiment, the S-CSCF sends the query request message to the HSS, to determine the address of the proxy-call session control function P-CSCF device that corresponds to the terminated service information and the identity of the terminated UE. In this way, when the S-CSCF does not have data related to the terminated UE (for example, the S-CSCF is a reselected S-CSCF after an initial S-CSCF is faulty), the S-CSCF may obtain the address of the corresponding P-CSCF from the HSS, and may further send the terminated service request to the P-CSCF, to continue an IMS terminated service.

Optionally, before receiving the terminated service request sent by the I-CSCF, the receiving module 801 in the S-CSCF is further configured to receive a registration message of the terminated UE that is sent by the I-CSCF, where the registration message carries the identity of the terminated UE, service information of a service provided by a 5G core network slice, and the address of the P-CSCF. The S-CSCF device may further include a storage module 804, configured to store a correspondence between the identity of the terminated UE, the service information of the service provided by the 5GC network slice, and the address of the P-CSCF. When receiving the terminated service request, the S-CSCF device subsequently queries the correspondence for the address of the corresponding P-CSCF, and sends the received terminated service request to the P-CSCF.

In addition, the sending module 803 in the S-CSCF is further configured to send the identity of the terminated UE, the service information of the service provided by the 5GC network slice, and the address of the P-CSCF to the HSS by using a message, and the HSS stores the correspondence, and backs up the correspondence. Therefore, when the S-CSCF is faulty, the correspondence may be sent to a reselected S-CSCF, to implement fault recovery, thereby ensuring continuity of an IMS service.

FIG. 9 is a schematic diagram of functions of user equipment according to Embodiment 9 of this application.

As shown in FIG. 9, the user equipment provided in this embodiment of this application includes: an information obtaining module 901, configured to obtain service information of a service provided by a 5GC network slice and an address of a proxy-call session control function P-CSCF device in an IMS network; and a registration module 902, configured to send a registration message to the P-CSCF based on the address, where the registration message carries the service information of the service provided by the 5GC network slice. The registration module 902 may add the service information to a header field of the registration message.

The user equipment provided in this embodiment of this application may be used in the foregoing method embodiments, and completes the method steps on the user equipment side in the method embodiments through cooperation of the information obtaining module 901 and registration module 902. The information obtaining module 901 and the registration module 902 in this embodiment may further implement other functions of the user equipment in the foregoing method embodiments, and details are not described herein again.

Compared with user equipment in the prior art, the user equipment provided in this embodiment has the same beneficial effect as the foregoing method embodiments when performing the foregoing communication procedure.

Optionally, in the user equipment provided in this embodiment, the step in which the information obtaining module 901 obtains the service information of the service provided by the 5GC network slice may specifically include: when the user equipment attaches to the 5G core network slice (5GC network slice), obtaining, by the information obtaining module 901 from the 5G core network slice (for example, an AMF), the service information of the service provided by the 5GC network slice.

In addition, that the information obtaining module 901 obtains an address of a proxy-call session control function P-CSCF device in an IMS network includes: obtaining, by the information obtaining module 901 from the 5G core network slice (for example, the AMF), the address of the proxy-call session control function P-CSCF device in the IMS network when the user equipment establishes a PDU session with the 5G core network slice.

Both the S-CSCF in Embodiment 8 and the user equipment in Embodiment 9 are presented in a form of functional modules. The "module" herein may be an application-specific integrated circuit, a processor and a memory that execute one or more software programs or firmware programs, an integrated logic circuit, and/or another component that can provide the foregoing functions. A person skilled in the art may figure out that the S-CSCF and the user equipment in the embodiments may alternatively be implemented in a form of hardware shown in FIG. 6 and FIG. 7, respectively.

For example, all the functions implemented by the receiving module 801, the determining module 802, and the sending module 803 in the S-CSCF may be implemented by using the processor 601 and the memory 602 in FIG. 6. For example, that the receiving module 801 receives a terminated service request sent by an interrogating-call session control function I-CSCF device may be implemented by the processor 601 by executing the code stored in the memory 602.

All the functions implemented by the information obtaining module 901 and the registration module 902 in the user equipment may be implemented by the processor 701 and the memory 702 in FIG. 7. For example, the step in which the information obtaining module 901 obtains the service information of the service provided by the 5GC network slice and the address of the proxy-call session control function P-CSCF device in an IMS network may be implemented by the processor 701 by executing the code stored in the memory 702.

In addition, the processor configured to implement functions of the user equipment and the home subscriber server may be a central processing unit, a general-purpose processor, a digital signal processor, an application-specific integrated circuit, a field programmable gate array or another programmable logic device, a transistor logic device, a hardware component, or any combination thereof. The processor may implement or execute various example logical blocks, modules, and circuits described with reference to content disclosed in the present invention. Alternatively, the processor may be a combination of processors implementing a computing function, for example, a combination including one or more microprocessors.

The foregoing descriptions are merely specific implementations of the present invention, but are not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. A method, comprising:
receiving, by a first service-call session control function (S-CSCF) device, a terminated service request sent by an interrogating-call session control function (I-CSCF) device, wherein the terminated service request carries an identity of terminated user equipment (UE) and terminated service information, and the terminated UE registers to each of at least two proxy-call session control function (P-CSCF) devices that correspond to different network slices;
determining, by the first S-CSCF device, an address of a first P-CSCF device that is in the at least two P-CSCF devices and that corresponds to the terminated service information and the identity of the terminated UE, wherein different P-CSCF devices in the at least two P-CSCF devices correspond to different services of the terminated UE; and
sending, by the first S-CSCF device, the terminated service request to the first P-CSCF device.

2. The method according to claim 1, wherein determining the address of the first P-CSCF device that is in the at least two P-CSCF devices and that corresponds to the terminated service information and the identity of the terminated UE comprises:
sending a query request message to a home subscriber server (HSS), wherein the query request message queries the address of the first P-CSCF device that corresponds to the identity of the terminated UE and the terminated service information, and the query request message carries the identity of the terminated UE and the terminated service information; and
receiving a query response message sent by the HSS, wherein the query response message carries the address of the first P-CSCF device that corresponds to the identity of the terminated UE and the terminated service information.

3. The method according to claim 1, wherein determining the address of the first P-CSCF device that is in the at least two P-CSCF devices and that corresponds to the terminated service information and the identity of the terminated UE in the terminated service request comprises:

querying a local correspondence for the address of the first P-CSCF device that corresponds to the terminated service information and the identity of the terminated UE in the terminated service request.

4. The method according to claim 1, wherein before receiving the terminated service request sent by the I-CSCF device, the method further comprises:

receiving a registration message of the terminated UE that is sent by the I-CSCF device, wherein the registration message carries the identity of the terminated UE, service information of a service provided by a 5G core network slice, and the address of the first P-CSCF device; and storing a correspondence between the identity of the terminated UE, the service information of the service provided by the 5G core network slice, and the address of the first P-CSCF device.

5. The method according to claim 4, further comprising:

sending the identity of the terminated UE, the service information of the service provided by the 5G core network slice, and the address of the first P-CSCF device to a home subscriber server (HSS).

6. The method according to claim 1, wherein before receiving the terminated service request sent by the I-CSCF device, the method further comprises:

receiving, by the I-CSCF device, the terminated service request, and determining that an initial S-CSCF device with which the terminated UE in the terminated service request has registered is faulty; and sending, by the I-CSCF, the terminated service request to the first S-CSCF device.

7. A system, comprising:
a first service-call session control function (S-CSCF) device;
an interrogating-call session control function (I-CSCF) device; and
at least two proxy-call session control function (P-CSCF) devices that correspond to different network slices;
wherein the first S-CSCF device is configured to:
receive a terminated service request sent by the I-CSCF device, wherein the terminated service request carries an identity of terminated user equipment (UE) and terminated service information, and the terminated UE registers to each of the at least two P-CSCF devices;
determine an address of a first P-CSCF device of the at least two P-CSCF devices, wherein the first P-CSCF device corresponds to the terminated service information and the identity of the terminated UE, and wherein different P-CSCF devices in the at least two P-CSCF devices correspond to different services of the terminated UE; and
send the terminated service request to the first P-CSCF device.

8. The system according to claim 7, further comprising:
a home subscriber server (HSS);
wherein the first S-CSCF device being configured to determine the address of the first P-CSCF device of the at least two P-CSCF devices, the first P-CSCF device corresponding to the terminated service information and the identity of the terminated UE in the terminated service request, comprises the first S-CSCF device being configured to:

send a query request message to the HSS, wherein the query request message queries for the address of the first P-CSCF device corresponding to the identity of the terminated UE and the terminated service information, and the query request message carries the identity of the terminated UE and the terminated service information; and receive a query response message sent by the HSS, wherein the query response message carries the address of the first P-CSCF device corresponding to the identity of the terminated UE and the terminated service information.

9. The system according to claim 7, wherein the first S-CSCF device is further configured to:

before receiving the terminated service request sent by the I-CSCF device, receive a registration message of the terminated UE that is sent by the I-CSCF device, wherein the registration message carries the identity of the terminated UE and the address of the first P-CSCF device; and store a correspondence between the identity of the terminated UE and the address of the first P-CSCF device.

10. The system according to claim 7, wherein the I-CSCF device is configured to:

receive the terminated service request, and determine that an initial S-CSCF device with which the terminated UE in the terminated service request registers is faulty; and send the terminated service request to the first S-CSCF device.

11. An apparatus, comprising:
a non-transitory memory; and
a processor coupled with the non-transitory memory, wherein the non-transitory memory stores program instruction, when the program instruction is processed by the processor, the apparatus is caused to:
receive a terminated service request sent by an interrogating-call session control function (I-CSCF) device, wherein the terminated service request carries an identity of terminated user equipment (UE) and terminated service information, and the terminated UE registers to each of at least two proxy-call session control function (P-CSCF) devices that correspond to different network slices;
determine an address of a first P-CSCF device of the at least two P-CSCF devices that corresponds to the terminated service information and the identity of the terminated UE, wherein different P-CSCF devices in the at least two P-CSCF devices correspond to different services of the terminated UE; and
send the terminated service request to the first P-CSCF device.

12. The apparatus according to claim 11, wherein determining the address of the first P-CSCF device of the at least two P-CSCF devices that corresponds to the terminated service information and the identity of the terminated UE comprises:

sending a query request message to a home subscriber server (HSS), wherein the query request message queries for the address of the first P-CSCF device that corresponds to the identity of the terminated UE and the terminated service information, and the query request message carries the identity of the terminated UE and the terminated service information; and receiving a query response message sent by the HSS, wherein the query response message carries the address of the first P-CSCF device that corresponds to the identity of the terminated UE and the terminated service information.

13. The apparatus according to claim 11, wherein determining the address of the first P-CSCF device of the at least two P-CSCF devices that corresponds to the terminated service information and the identity of the terminated UE in the terminated service request comprises:
querying a local correspondence for the address of the first P-CSCF device that corresponds to the terminated service information and the identity of the terminated UE in the terminated service request.

14. The apparatus according to claim 11, wherein the apparatus is further caused to:
receiving a registration message of the terminated UE that is sent by the I-CSCF device, wherein the registration message carries the identity of the terminated UE, service information of a service provided by a 5G core network slice, and the address of the first P-CSCF device; and
storing a correspondence between the identity of the terminated UE, the service information of the service provided by the 5G core network slice, and the address of the first P-CSCF device.

15. The apparatus according to claim 14, wherein the apparatus is further caused to:
send the identity of the terminated UE, the service information of the service provided by the 5G core network slice, and the address of the first P-CSCF device to a home subscriber server (HSS).

* * * * *